(12) United States Patent
Van Welzen et al.

(10) Patent No.: US 11,087,162 B2
(45) Date of Patent: Aug. 10, 2021

(54) DETERMINING RELATIVE REGIONS OF INTEREST IN IMAGES USING OBJECT DETECTION

(71) Applicant: NVIDIA Corporation, San Jose, CA (US)

(72) Inventors: James Van Welzen, Durham, NC (US); Jonathan White, Fort Collins, CO (US); David Clark, Cary, NC (US); Nathan Otterness, Mebane, NC (US); Jack Van Welzen, Raleigh, NC (US); Prakash Yadav, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 106 days.

(21) Appl. No.: 16/528,891

(22) Filed: Aug. 1, 2019

(65) Prior Publication Data

US 2021/0034906 A1 Feb. 4, 2021

(51) Int. Cl.
*G06K 9/32* (2006.01)

(52) U.S. Cl.
CPC ......... *G06K 9/3266* (2013.01); *G06K 9/3241* (2013.01); *G06K 2209/01* (2013.01)

(58) Field of Classification Search
CPC ............... G06K 9/3266; G06K 9/3241; G06K 2209/01; G06K 9/325
See application file for complete search history.

(56) References Cited

U.S. PATENT DOCUMENTS

| 2009/0079813 | A1* | 3/2009 | Hildreth | G06F 3/017 348/14.03 |
| 2009/0327894 | A1* | 12/2009 | Rakib et al. | G06F 3/01 715/719 |
| 2018/0082123 | A1* | 3/2018 | Katz et al. | G06K 9/00724 |
| 2019/0384304 | A1* | 6/2019 | Towal et al. | G06K 9/00 |

* cited by examiner

*Primary Examiner* — Siamak Harandi
(74) *Attorney, Agent, or Firm* — Shook, Hardy & Bacon, L.L.P.

(57) ABSTRACT

In various examples, frames of a video may include a first visual object that may appear relative to a second visual object within a region of the frames. Once a relationship between the first visual object and the region is known, one or more operations may be performed on the relative region. For example, optical character recognition may be performed on the relative region where the relative region is known to contain textual information. As a result, the identification of the first visual object may serve as an anchor for determining the location of the relative region including the second visual object—thereby increasing accuracy and efficiency of the system while reducing runtime.

20 Claims, 5 Drawing Sheets

DETERMINING RELATIVE REGIONS OF INTEREST IN IMAGES USING OBJECT DETECTION

BACKGROUND

Detection of visual cues (e.g., heads-up display (HUD) elements, event feeds, textual information, etc.) in a streaming video or a playback thereof may be useful for a variety of reasons, such as to identify and/or track events, actions, achievements, or other information about the video. For example, with respect to a game streaming environment, this information may be useful to track achievements, progress, or other criteria of different users within a game, or to identify recording events or actions for triggering the generation of a snapshot, a short video clip or highlight, or a longer recording of at least a portion of the video.

However, the location of visual cues in the video may be dynamic—even within the same game in some instances—making it difficult to detect the visual cues using fixed-anchor points. For example, as a result of updates in versions of a game, differences in end-user configurations, HUD bouncing (e.g., for entertainment effect), scrolling feeds (e.g., kill feeds, event feeds, etc.), variable content, and/or other effects, the location of the visual cues may vary—even on a frame by frame basis. To identify these visual cues, traditional approaches have relied on brute force object recognition or detection algorithms that scan an entirety of the frames of the video. As a result, these traditional methods are computationally expensive, requiring an increased amount of computing resources, time (e.g., making real-time application burdensome), and recognition cycles to identify visual objects and visual cues in the video.

SUMMARY

Embodiments of the present disclosure relate to determining relative regions of interest in images using object detection. Systems and methods are disclosed that may detect static and dynamic objects in a video (e.g. visual cues) by leveraging contextual information. For instance, regions that appear at dynamic locations in frames of a video relative to a dynamic or static object may be detected using fixed-location detection. As such, once an initial object (e.g., a weapon icon) is detected by, for example, using free-location detection, the relative region (e.g., including textual information about the weapon) may be detected or otherwise identified.

In contrast to conventional systems, such as those described above, the present disclosure detects or identifies relative regions nested in a video (e.g., a streaming video, or a recording or playback thereof) to optimize visual object recognition within the video. In this way, visual objects (or cues) that appear at dynamic locations, and may be difficult to detect (e.g., textual information) may be more easily detected using fixed-location detection relative to another object (e.g., a graphical object that may be more readily identifiable to object detection or identification algorithms). By leveraging the detected object to identify the relative region—e.g., to perform optical character recognition (OCR) on the relative region—time and computing resources may be conserved as compared to conventional brute force approaches.

As an example, frames of a video may include a plurality of visual objects including static objects, substantially static objects, and/or dynamic objects. Certain of these visual objects may appear within the frames relative to another of the visual objects, as determined by inspection, analysis (e.g., using machine learning), another technique, or a combination thereof. As a result, once a visual object having an associated relative object or region is detected, the known relative region of the associated object may be determined, and one or more operations may be performed on the relative region. For example, OCR may be performed on the relative region where the relative region is known to contain textual information. This eliminates the need for brute force analysis of the frames of the video, thereby increasing accuracy and efficiency of the system while reducing run-time.

BRIEF DESCRIPTION OF THE DRAWINGS

The present systems and methods for determining relative regions of interest in images using object detection are described in detail below with reference to the attached drawing figures, wherein.

DETAILED DESCRIPTION

Systems and methods are disclosed related to determining relative regions of interest in images using object detection. According to various embodiments there is provided, among other things, an automated means to adapt region of interest or relative region parameters to accommodate dynamic regions in a video (e.g., regions that are dynamic from frame to frame) and/or real-time differences in mostly static regions in a video (e.g., regions that are different system to system). According to various embodiments, this visual cue or anchor object detection can be accomplished at execution or initiation of a streaming or playback session through the detection of a first object (e.g., a representative or anchor object, which may be a graphical object, in embodiments) which may be utilized to anchor a region of interest or relative region for the detection of a second object (e.g., a relative object, which may be textual, or contextual, in embodiments).

The detection or identification of objects in images or video may be accomplished by leveraging information about the frames of images or video and the objects therein. In some instances, this information may include the relative locations of objects with respect to one another. Accordingly, in instances where the relative positions of graphical objects in frames of a video are fixed, this information may be used to improve the accuracy, efficiency, and simplicity of executing detection or recognition mechanisms for identifying objects within the frames.

For example, a first object (e.g., a graphical object) within a frame may be detected (e.g., using detection mechanisms that are tolerant of moving objects). The first object may have a known spatial relationship to a second object (e.g., a textual object). Once the first object is detected, the location of the first object may be used to define an anchor point for a relative region to search for, and detect, or otherwise identify the second object (e.g., using recognition functions, such as optical character recognition (OCR)). In some instances, the configuration of the detection may be achieved by associating the first object with the second object and further defining the search parameters for the second object relative to the first object.

In some embodiments, the processes described herein may be implemented for detecting events, or contextual information related thereto, that occur during an instance of a game that may be captured in a video (e.g., a stream, a playback, etc.). As an example, when the event includes a player being eliminated from a game, an opposing player who eliminated the player, the weapon or action that was used to perform the elimination, and/or any other contextual information related to the event may be useful to the system for performing one or more operations (e.g., generating a snapshot or highlight, updating score or achievement information, etc.). As such, once a player is eliminated, a search for a weapon icon (e.g., the first object) may be performed on one or more frames of the video. Because a location of a region, relative to the location of the first object, may be known, the relative region may be analyzed to determine usernames, weapon types, and/or other information corresponding to the event. This analysis may include performing a recognition function (e.g., OCR) on the relative region of the frame across one or more frames of the video to determine the contextual information.

In some examples, the occurrence of the event may be determined from analysis of the relative region. In such examples—e.g., upon initiation of a streaming session or receipt of the video for playback—object detection may be performed on one or more frames of the video to identify a first object (e.g., a weapon icon), such that the relative region (e.g., a game feed) where contextual information is populated may be determined. Once the location of the relative region is determined from the location of the first object (e.g., the anchor object), the frames of the video may be analyzed within the relative region to identify events (e.g., eliminations, weapon fires, players leaving the game, player achievements, level ups, etc.). As other non-limiting examples, the first object may include a health indicator, a player profile icon, an item icon, and/or the like.

In some embodiments, a video may include various objects that move (e.g., during game play, as the game state changes). In addition, the information (e.g., within the relative region(s)) that moves with the objects may be of different types (e.g. text objects or other non-graphical objects). As such, multiple detection and/or identification mechanisms may be implemented. By using relative regions, the detection of the various, multiple objects in a video scene may be improved. For example, because an association between the various objects that are tracked and/or may appear in a video may be known, when a first object (e.g., a graphical object) is detected or otherwise identified by a first recognition mechanism, the system may know that a second object (e.g., a text object or other non-graphical object) is at an (x, y) position—in image space—relative to the first object. Using this information, the system may execute another recognition mechanism on the region relative to the first object—thereby leveraging knowledge of the frames of the video and types of movement of objects across frames to provide context for locating other objects and/or information within the video.

Although described within a gaming environment, this is not intended to be limiting, and the system of the present disclosure may be used within any image or video analysis space. For example, for television, sports, and/or movies (e.g., live, streaming, playback, or a combination thereof), similar analysis may take place. With respect to sports, certain graphical objects (e.g., player icons, arrows, labels, etc.) may have known relative regions that include textual information. As such, analysis may be performed on the frames of the video to determine a location of the graphical objects (e.g., a player icon), and the region of the frames relative to the location of the graphical objects may be scanned for contextual information (e.g., a player name, age, position, nationality, statistics, achievements, etc.). This information may be used to update records or logs, or to provide notifications of events or actions (e.g., goals scored, etc.).

Figure 1:
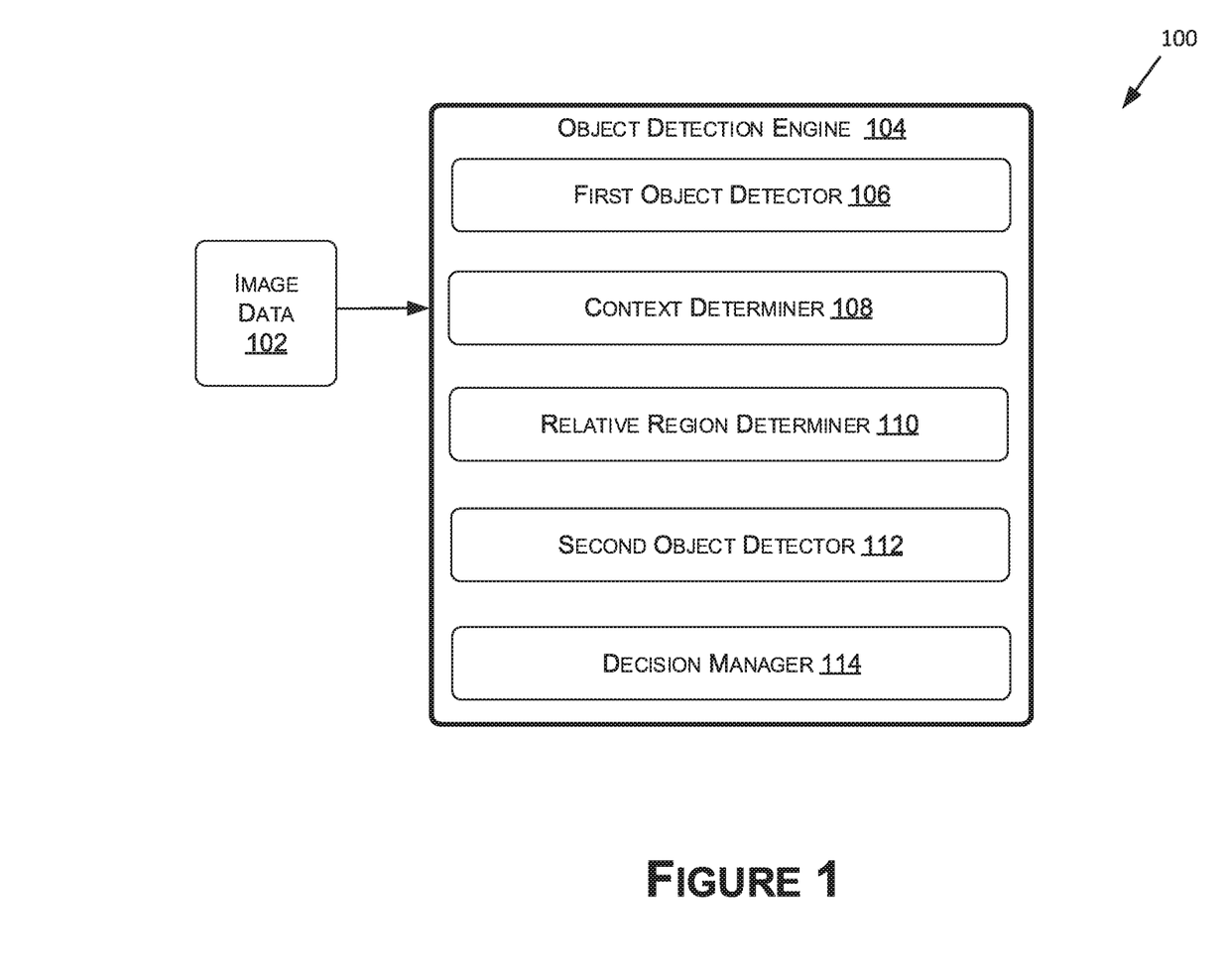
FIG. 1 is a block diagram illustrating an example system for object recognition utilizing relative regions, in accordance with some embodiments of the present disclosure.

With reference to FIG. 1, FIG. 1 is a block diagram illustrating an example object recognition system 100 utilizing relative regions, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The object recognition system 100 may include, among other things, a first object detector 106, a context determiner 108, a search region determiner 110, a second object detector 112, a decision manager 114, and/or other components, features, or functionality. Image data 102 may be provided to the object detection engine 104, for example, as frames, or sequences of frames (e.g., representative of a video scene 230 of FIG. 2). The video scene 230 represented by the image data 102 (e.g., frame 300 of FIG. 3) may include a variety of objects, such as static objects, mostly static objects, and/or dynamic objects. The first object detector 106 may apply an image recognition operation (e.g., an object detection algorithm, a computer vision algorithm, etc.) to the image data 102 to detect or otherwise identify an object(s) (e.g., graphical objects). In some embodiments, once a first object is determined or identified, the context determiner 108 may determine a context for the video scene. For example, based on events taking place within the video, user interactions (e.g. user inputs) with the video, game, streaming or playback application, and/or the like may be analyzed by the context determiner 108 to determine a context, or current state, of the video scene. The relative region determiner 110 may determine a relative region corresponding to the first object (e.g., a graphical object) to be used for detecting or otherwise identifying a second object (e.g., textual information). In some embodiments, such as where the context is known from the context determiner 108, the relative region determiner 110 may determine the location of the relative region using the context. In an example where a weapon icon is the first object, when a person is eliminated, the region relative to the weapon icon may be in a first location (e.g., to indicate a username of the player who eliminated the person), while the region relative to the weapon may be in a second location relative to the weapon icon when a user retrieves a weapon from within the game (e.g., to indicate the type of weapon retrieved, an amount of ammunition, attachments of the weapon, and/or where the weapon was retrieved from). This difference in relative region locations may be determined by the context determiner 108 and used by the relative region determiner 110. Once the relative region is determined, the second object detector 112 may apply a recognition operation (e.g., OCR) to the relative region of frames of the video corresponding to the second object to determine contextual information within the relative region. In some examples, the second object may be within the relative region, but may only occupy a portion of the relative region. In such examples, the second object detector 112 may first identify a more precise location, within the relative region, of the second object, and may determine the contextual information from the more precise location. Based on the identified or otherwise detected objects, the decision manager 114 may determine whether to take an action or perform one or more operations with respect to the video, such as to record or store a portion of the video, to update statistics or achievements, to generate notifications, and/or other actions or operations.

Figure 2:
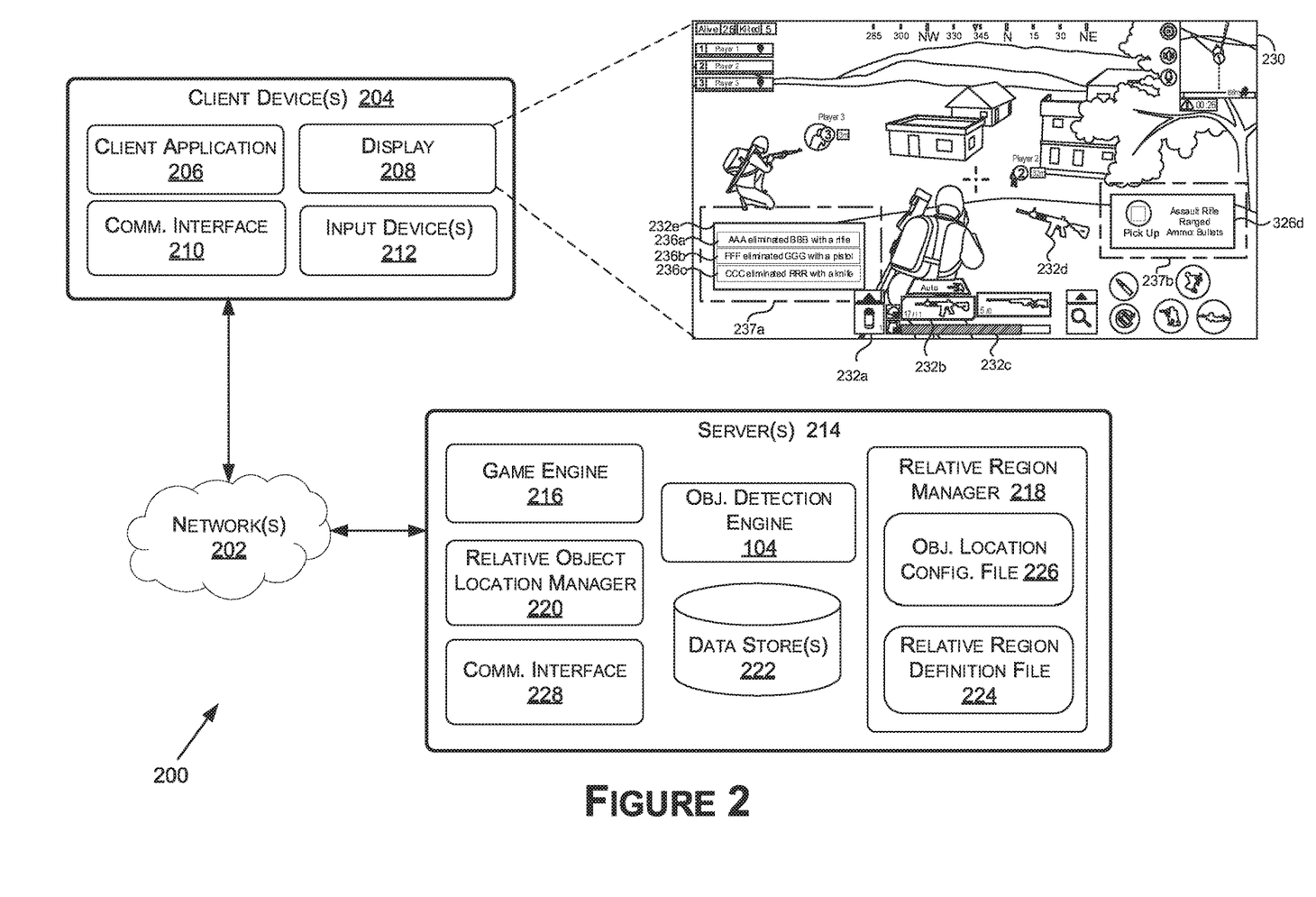
FIG. 2 is an example system diagram of an example object detection systems utilizing relative regions, in accordance with some embodiments of the present disclosure.

With reference to FIG. 2, FIG. 2 is an example system diagram of an example object detection system 200 utilizing relative regions, in accordance with some embodiments of the present disclosure. The object detection system 200 may include, among other things, client device(s) 204 and/or a server(s) 214. The object detection system 200 (and the components and/or features thereof) may be implemented using one or more computing devices, such as the computing device 500 of FIG. 5, described in more detail below.

Components of the object detection system 200 may communicate over network(s) 202. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), and/or another network type. In any example, each of the components of the object detection system 200 may communicate with one or more of the other components via one or more of the network(s) 202. The various components of the object detection system 200 may run on client device(s) 204 and/or server(s) 214, and the illustration of FIG. 2 associating components and features with devices is for example purposes, and not intended to be limiting.

The client device(s) 204 may include a smart phone, a laptop computer, a tablet computer, a desktop computer, a wearable device, a game console, a set-top box, a virtual reality system (e.g., a headset, a computer, a game console, remote(s), controller(s), and/or other components), a streaming device (e.g., an NVIDIA SHIELD), a smart-home device that may include an intelligent personal assistant, and/or another type of device capable of supporting game play (e.g., cloud game streaming, local gaming, cloud gaming, etc.), streaming, and/or display of the images and/or video.

The client device(s) 204 may include a client application 206 (e.g., a game application, a streaming application, a game streaming application, a video or image display and playback application, etc.), a display 208, a communication interface 210, and/or an input device(s) 212. Although only a few components and/or features of the client device(s) 204 are illustrated in FIG. 1, this is not intended to be limiting. For example, the client device(s) 204 may include additional or alternative components, such as those described below with respect to the computing device 500 of FIG. 5.

The client application 206 may include a mobile application, a computer application, a console application, and/or another type of application. In examples where the client application 206 is a game application (e.g., in a cloud gaming environment), the client application 206 may be configured to receive input data representative of user inputs to the one or more input device(s) 212, use and/or transmit the input data to the server(s) 214, retrieve game data from memory or local storage, receive the game data using the communication interface 210 from the game server(s) 126, and/or cause display of the game (or a stream thereof) on the display 208. In other words, the client application may operate as a facilitator for enabling playing of a game associated with the game application on the client device(s) 204.

In some examples, the client device(s) 204 may render the game using the client application 206, while in other examples, the client device(s) 204 may receive display data (e.g., encoded display data) and use the display data to display the game on the display 208. In some examples, a first client device may render the game while a second client device may receive the display data and display the game using the display data. In examples where the display data is received by the client device (e.g., where the client device 204 does not generate the rendering), the object detection system 200 may be part of a game streaming system.

The display 208 may include any type of display capable of displaying images or video (e.g., as represented by the image data 102) of a stream, a recording, and/or a game. The display 208 may include a light-emitting diode display (LED), an organic LED display (OLED), a liquid crystal display (LCD), an active matrix OLED display (AMOLED), a quantum dot display (QDD), a plasma display, and/or another type of display. In some examples, the display 208 may include more than one display (e.g., a dual-monitor display for computer gaming, a first display for configuring a game and a virtual reality display for playing the game, etc.). In some examples, the display 208 may be a touchscreen display, such as a touch-screen of a smart phone, tablet computer, laptop computer, or the like, where the touch-screen is at least one of the input device(s) 212 of the client device 204.

The input device(s) 212 may include any type of devices that are capable of providing user inputs to the client device(s) 204. The input device(s) may include a keyboard, a mouse, a touch-screen display, a controller(s), a remote(s), a headset (e.g., sensors of a virtual reality headset), a microphone (e.g., for voice commands), and/or other types of input devices.

The communication interface 210 may include one or more components and features for communicating across one or more networks, such as the network(s) 202. The communication interface 210 may be configured to communicate via any number of network(s) 202, described herein. For example, to communicate in the object detection system 200 of FIG. 2, the client device(s) 204 may use an Ethernet or Wi-Fi connection through a router to access the Internet in order to communicate with the server(s) 214, and/or with other client device(s) 204.

The client device 204 may display, via display 208, a frame 300 (FIG. 3) depicting a video scene 230 that is provided during a streaming session (e.g., a game streaming session), a game play session (e.g., a local, on client device 204, game session), a playback of a recording, and/or in another circumstance. For a non-limiting example, the video scene 230 may correspond to gameplay using a game application (e.g., the client application 206). With reference to video scene 230 (e.g., a first person shooter (FPS) type game), a plurality of visual objects and information associated with the video scene 230 may be represented in frames of video (e.g., the video scene 230 may represent a frame of the video scene 230 from within an instance of a game). In some embodiments, the visual objects may include first (e.g., graphical) objects 232 (e.g., the objects 232a-232e) and second (e.g., textual, or non-graphical) objects 236 (e.g., the objects 236a-236d). In some examples, the first objects 232 may be anchor objects that may be substantially continuously displayed within the game, or may be anchor objects that when appearing, generally have a second, relative object 236 associated with them. These types of objects may include a health of a player (e.g., 232c) or weapons and/or items the player is carrying (e.g. 232a and 232b)—as indicated in a status region of the video scene 230, for example. As another example, the first objects 232d may include weapons within the game which may be retrievable by users, such that when the first objects 232 are in a field of view or within a certain proximity to a user's character within the game, a second object 236d may appear relative to the first object 232d. In some examples, the second objects 236 may include objects that appear intermittently or periodically based on gameplay (e.g., in response to events occurring during gameplay), or that change or update throughout game play (e.g., names, weapons, achievements, item availability, or other contextual information). For example, the game feed may include a first object 232e and may provide an anchor for the associated second objects 236a-236c, which may indicate players who have eliminated other players, and the weapons used for the elimination.

Although various examples are described herein with respect to a first person shooter (FPS) type game, this is not intended to be limiting and may apply to various competitive and/or cooperative games, and eSports games in particular that may include, without limitation, racing, sports simulation, real-time strategy, massively multiplayer online games, platform games, broadcasted video etc. In addition, although the video scene 230 may include an illustration of an instance of a game, this is not intended to be limiting. Similar first objects 232 (e.g., anchor objects) and second objects 236 (e.g., relative objects) may be identified and leveraged in any type of image or video display environment, such as any technology area including image, television, and/or video streaming or playback.

The server(s) 214 may include one or more servers (e.g., dedicated game servers, streaming servers, recording servers, etc.) for storing, hosting, managing, and, in some examples, rendering a game. In examples where the object detection system 200 is used for a gaming environment, first server(s) 214 may be used to create, update, and modify a game (e.g., the program code of the game), and second server(s) 214 may be used to host the game (e.g., as dedicated game servers). In other examples, such as in a streaming environment (e.g., live streaming or recordings), the server(s) 214 may transmit the stream to the client device(s) 204 for display and/or analysis. In a some embodiments, the components, features, and/or functionality of the server(s) 214 may be performed on the client device(s) 204, in addition to the functionality of the client device(s) 204. Although only a few components and/or features of the server(s) 214 are illustrated in FIG. 2, this is not intended to be limiting. For example, the server(s) 214 may include additional or alternative components, such as those described below with respect to the computing device 500 of FIG. 5.

The server(s) 214 may include one or more APIs to enable game play, streaming, and/or playback of images or video at the client device(s) 204 and/or to enable communication of information (e.g., relative region profiles, game data, etc.) with the client device(s) 204. For example, in a game play environment, the server(s) 214 may include one or more game APIs that interface with the client applications 206 of the client device(s) 204 to enable game play by the client device(s) 204. Although different APIs are described herein, the APIs may be part of a single API, two or more of the APIs may be combined, different APIs may be included other than those described as examples herein, or a combination thereof.

In game play environments, the server(s) 214 may include a game engine 216. The game engine 216 may include features and functionality that enable a game to be played, streamed, watched, or a combination thereof by one or more users over a network (e.g., in a massively multiplayer online environment, a cloud gaming environment, a game streaming environment, a combination thereof, etc.). In some embodiments, the game engine 216 may include a rendering engine, an audio engine, a physics engine, an animation engine, an artificial intelligence engine, a networking engine, a streaming engine, a memory management engine, and/or other components or features. The game engine 216 may be used to instantiate object detection engine 104 and/or make requests to relative region manager 218 and/or data store(s) 222 during gameplay, streaming, and/or recording of the game. In some examples, at least some of the features and functionality of the game engine 216 may be executed on the client device(s) 204.

The server(s) 214 may include a relative region manager 218. The relative region manager 218 may store relative region definition file(s) 224 and/or object location configuration file(s) 226. In some embodiments, relative region definition file(s) 224 and/or object location configuration file(s) 226 may be stored in data store(s) 222 and accessed and/or retrieved by relative region manager 218. The objection location configuration file(s) 226 may store associations between first (e.g., anchor) objects 232 in frames of video and second (e.g., relative) objects 236 in the frames. In some examples, such as within game play environments, the code of the client application 206 and/or the game engine 216 may dictate that relative positions of the second objects 236 with respect to the first objects 232 may remain fixed, or static, during the execution of the application. For example, with reference to the video scene 230, the first objects 232a-232c may be located at a fixed relative position to the elimination feed (e.g., the first object 232e), or a line or boundary indicative thereof, within frames of the game. As another example, the second objects 236a-236c may be located at a relative location with respect to one or more of the first objects 232a-232c in the status region of the frame. As such, once one of the first objects 232 is identified or located, the relative location may be used to identify a relative region 237 where the second objects 236a-236c may be located. In either example, where first objects 232 are static within instances of a game, this information may be stored in the object location configuration file(s) 226. Because end user configurations, game versions, and/or other criteria may affect the actual locations of these first objects 232 (even where static), the object location configuration file(s) 226 may be updated at the initiation or start of a session (e.g., a game session, a streaming session, a playback session, etc.), or may be updated for each client device 204 (e.g., once at initial setup, periodically, each session, etc.).

In some embodiments, the determination of the relative positions between first objects 232 and second objects 236 may be performed using machine learning. For example, a machine learning model (e.g., a convolutional neural network (CNN)) may be trained or programmed to identify reoccurrences of objects (e.g., the first objects 232) and associated objects (e.g., the second objects 236). As such, these reoccurrences may be used (e.g., by the machine learning model) to learn relationships between the first objects 232 and the second objects 236. Any type of machine learning model may be used, without limitation, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

In other embodiments, these relationships between the first objects 232 and the second objects 236 may be observed and/or programmed, such that the relative regions corresponding to the second objects 236 are known by the object detection system 200 in view of, or relative to, determined locations of the first objects 232. In any embodiments, the relative region manager 218 and/or the relative object location manager 220 may determine, program, learn, update, and/or store these relationships between locations of the first objects 232 and the locations of the second objects 236.

Relative regions (e.g., the relative regions 237a or 237b) may be defined for one or more of the first objects 232, such as the first objects 232 having known locations in the video scene 230 (e.g., the locations may be known because the locations are static, because the locations are substantially static or dynamic and have been identified or determined using object detection or computer vision algorithms, or a combination thereof). In some instances, for example, once locations have been identified or determined, the first objects 232 may be referred to as anchor objects, which may have a known anchor point(s) (e.g., in 2D pixel coordinates). The anchor points for each of the first objects 232 may be a single anchor point (e.g., a center point, a vertex, etc.), or may be multiple anchor points (e.g., vertices of the first objects 232, random point, etc.). Once the anchor points are known for the first objects 232, and the associations between the first objects 232 and one or more relative regions 237 associated with the second objects 236 are known (e.g., the relative relationship in locations), delta values—e.g., pixel distances from the anchor point location to one or more points of the relative regions 237—may be determined. For example, for each anchor point(s) associated with a first object 232, a delta x value (e.g., a pixel distance(s) in an x direction, along a row of pixels in the frame and between the anchor point(s) and one or more points of the relative region 237, such as a vertex(ices) of the relative region 237) and a delta y value (e.g., a pixel distance(s) in a y direction, along a column of pixels in the frame and between the anchor point(s) and one or more points of the relative region 237, such as a vertex(ices) of the relative region 237) may be determined. These delta values may be used to define the dimensions and locations of the relative regions 237 corresponding to the second objects 236. In some embodiments, the relative region 237 may be defined by a point at a (x, y) distance away from the anchor point and a dimensionality component (e.g., a length and width, in pixels, of the relative region 237, a radius or diameter of the relative region 237 if they relative region is circular, or another dimensionality depending on the shape of the relative region 237). In other embodiments, the relative region 237 may be defined by the vertices, or may be defined by the pixels that make up the relative region 237. In any example, the location of the first object 232, the location of the relative region 237 with respect to the first object 232, and the dimensions of the relative region 237 may be used to define the location and size of the relative region 237 in frames of video.

In some examples, the shape of the relative region 237 may correspond to the known shape of the second object 236 (e.g., where the second object 236 includes text inside of a box or feed, the relative region 237 may be the size of the box or feed, or where the second object 236 includes a graphical object, the relative region 237 may conform to the shape of the graphical object). In other examples, the relative regions 237 may be a predefined shape, such as a circle, rectangle, square, triangle, polygon, or otherwise. In some examples, based on the type of the second object 236, the shape of the relative region 237 may change. In any example, the relative region 237 may include a buffer, or extra dimensionality, that accounts for accuracy loss, or other configuration information that may result in the actual location of the second objects 236 being in a different relative location to the first objects 232. For example, a dimensionality of the relative region 237 may be increased by a percentage, or a threshold amount, in an effort to increase the likelihood that the second object 236 is within the relative region 237. For non-limiting examples, the dimensionality or shape of the relative region 237 may be increased by (as non-limiting examples) 10%, 15%, 20%, and/or another percentage.

Once the relative region 237 is identified within a frame, object detection, computer vision, character recognition (OCR), and/or other algorithm types may be applied to the relative region 237 to identify contextual information. For example, where the second object 236 includes text (e.g., the second objects 236a-236c), OCR may be applied to the relative region 237a to determine the usernames of players who eliminated other players, to determine usernames of players who were eliminated, to determine types of weapons used in the elimination, and/or to determine other information. Similarly, for the relative region 237b, OCR (or another character recognition or text scanning process) may be applied to determine that an assault rifle is available for retrieval within the game, that the rifle is ranged, and that the rifle currently has ammunition including bullets. In addition, in some examples, object detection or computer vision algorithms may be performed on the relative region 237b to determine that the weapon is available for retrieval (e.g., as indicated by the square icon with "Pick Up" below). This information may be used, or stored, to indicate weapons that were or are available to characters within the game, and whether the weapons were retrieved or not, which may be helpful feedback for players or spectators of the instance of the game.

The server(s) 214 may include the object detection engine 104 (e.g. described in more detail herein with respect to FIG. 1). The object detection engine 104 may be called by game engine 216 during gameplay, for example, in response to a request to identify or otherwise detect objects in a video scene (e.g., the video scene 230). Additionally, the object detection engine 104 may call relative region manager 218 to load object location configuration file(s) 226 and/or relative region definition file(s) 224. In this way, the object detection engine 104 may leverage defined relative regions 237 for object detection in a frame representing the video scene 230. With reference to video scene 230, the object detection engine 104 may search for and detect or otherwise identify one or more of the first objects 232. In some non-limiting examples, the detection of the first objects 232 may be performed via object detection, computer vision, and/or free location detection (e.g., multi-image neural network based detection) mechanisms. Without limitation, any single detection model or combination of detection models may be used, such as Histogram of Oriented Gradients (HOG) detection, pattern matching, and/or other AI systems such as those implementing CNNs. Once the first object 232 is identified or otherwise detected (e.g., the weapon icon as the first object 232b), the object detection engine 104 may determine the relative region 237 for identifying or otherwise detecting one or more second objects 236 in a frame(s) depicting the video scene 230. To determine the relative region 237, for example, the object detection engine 104 may call, retrieve, or otherwise use a relative region definition file 224 corresponding to the first object 232. Based on the determined relative region 237, the object detection engine 104 may search for, detect, or otherwise identify one or more second objects 236 in the frame(s) depicting the video scene 230. In some examples, as described herein, such as where the second object 236 includes a textual object, OCR or another character recognition algorithm may be used. The identified and/or detected visual objects may be provided to the client application 206 and/or the game engine 216 in order to make a decision regarding whether to take some further action, for example to record a portion of the video scene, to take a screenshot, to update records or achievements, to generate a notification, and/or to determine that an event of interest has occurred.

Communication interface 228 may include one or more components and features for communicating across one or more networks, such as the network(s) 202. The communication interface 228 may be configured to communicate via any number of network(s) 202, described herein. For example, to communicate in the object detection system 200 of FIG. 2, the server(s) 214 may communicate over a LAN with other server(s) and/or over the Internet with other server(s) and/or the client device(s) 204.

Figure 3:
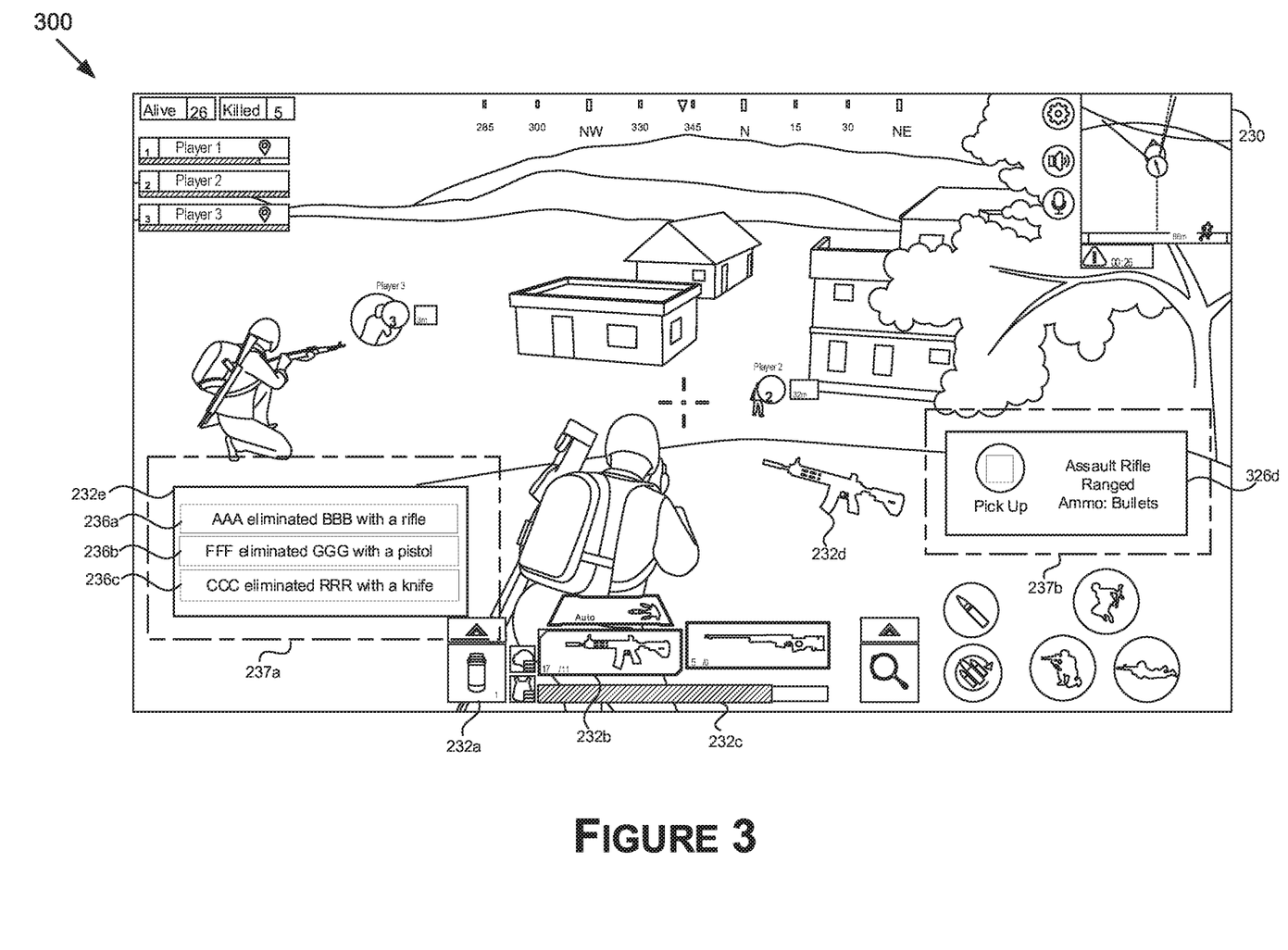
FIG. 3 is an illustration depicting exemplary implementations of object detection utilizing relative regions, in accordance with some embodiments of the present disclosure.

Now referring to FIG. 3, FIG. 3 is an example illustration depicting various aspects of implementing object detection and/or recognition using relative regions, in accordance with some embodiments of the present disclosure. A frame 300 may depict the video scene 230, as described herein at least with respect to FIG. 2, where the frame 300 is of an instance of a game (e.g., during live game play, during a stream of the game, as a recording of the game, etc.). The frame 300 may include a single frame, or may be one frame of a plurality of frames that make up a video or a sequence of images. The video scene 230 may include various objects that may include the first objects 232 and the second objects 236. The object detection system 200 of FIG. 2 may be used to identify or determine locations of the first objects 232. These locations may then be used, in addition to the known or determined locations of the relative regions 237 relative to the first objects 232, to determine locations of, identities of, and/or retrieve contextual information from the second objects 236 within the relative regions 237. As a result, the portion of the frame(s) 300 that need to be analyzed (e.g., using object detection, computer vision, machine learning analysis, OCR, etc.) may be reduced to the relative region(s) 237. This may expedite processing, reduce compute resource utilization, decrease run-time, and improve accuracy as compared to conventional system—such as conventional systems that implement brute force approaches.

Figure 4:
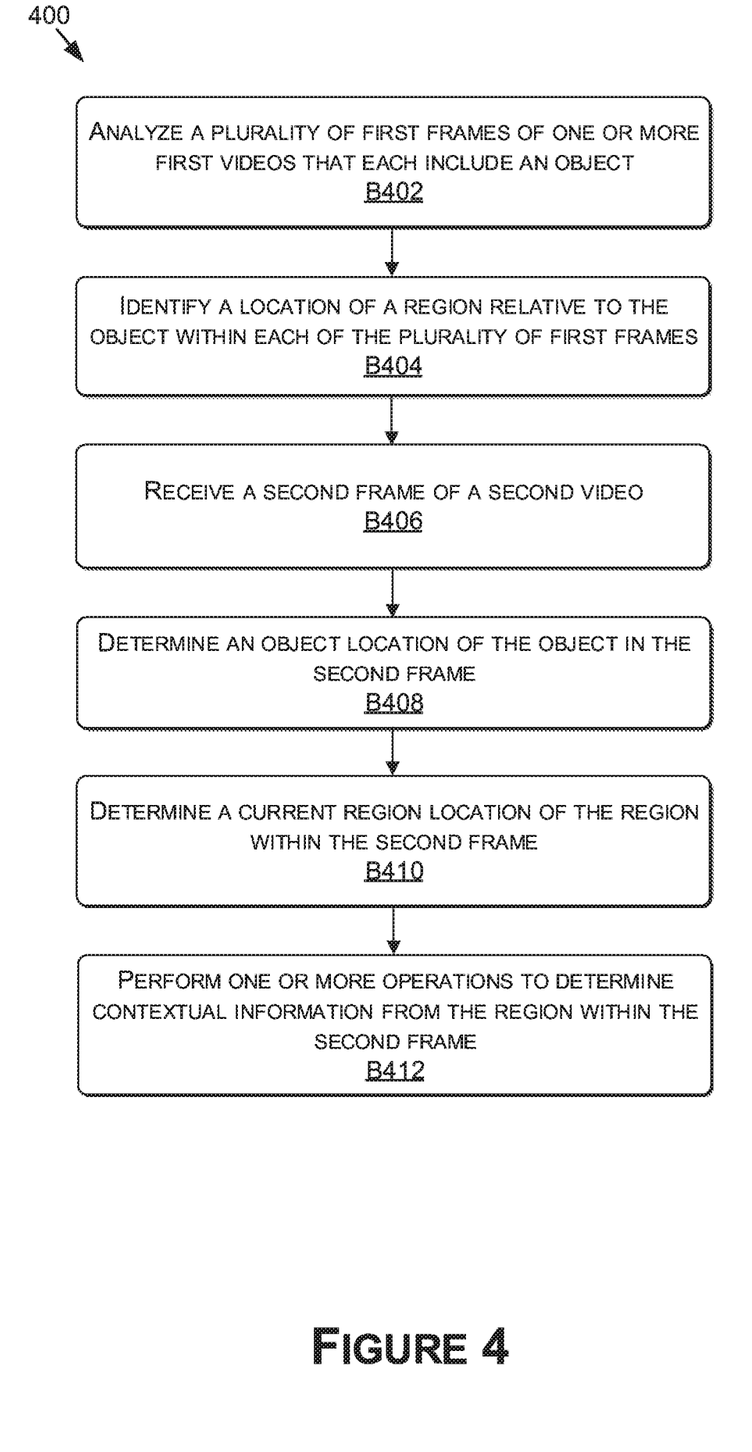
FIG. 4 is a flow diagram illustrating a method for object detection utilizing relative regions, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the systems of FIG. 1 and FIG. 2. However, this method 400 may additionally or alternatively be executed by any one system, or any combination of systems, including, but not limited to, those described herein.

FIG. 4 is a flow diagram showing a method 400 for object detection utilizing relative regions, in accordance with some embodiments of the present disclosure. The method 400, at block B402, includes analyzing a plurality of first frames of one or more first videos that each include an object. For example, the object detection system 200 may analyze a plurality of frames (e.g., the frames 300) that each include a first object(s) 232. The analysis may include computer vision, object detection, visual analysis, machine learning or artificial intelligence analysis, and/or another analysis type. A result of the analysis may be a relationship between the first object(s) 232 and one or more second objects 236—such as a relationship where the second object(s) 236 appear relative to the first object(s) 232. This relationship may be continuous, may be in response to certain events within the video (e.g., goals scored, players eliminated, buttons pressed, etc.), may be each time the first object 232 appears (e.g., when a weapon icon, as a first object 232, appears on the screen, a textual notification, as a second object 236, appears near the weapon to indicate weapon attributes or availability), and/or may be another type of relationship.

The method 400, at block B404, includes identifying a location of a region relative to the object within each of the plurality of first frames. For example, the location of the second object(s) 236 relative to the first object(s) 232 within each of the frames may be determined. In some examples, the location of the object(s) 236 may be identical each time, may be slightly skewed, may be shifted based on context, and/or the like, and the relative region 237 may be determined with this as a consideration. For example, where the second object 236 appears substantially in the same relative location with respect to the first object 232, the relative region 237 may be at the location of and of a dimension that includes at least the second object 236 (e.g., a text region). As another example, where the second object 236 is skewed, or shifts, the relative region 237 may include a larger region that captures each of the possible locations of the second object 236 relative to the first object 232. In some examples, the context determiner 108 of the object detection system 200 may determine where the relative regions 237 should be located based on the context of the video scene. In such examples, where an object (e.g., a weapon in a game) is located within an environment of a game, the relative region 237b may be used, and when the object is located within a game feed, the relative region 237a may be used. As another example, when an item is on a right side of a frame (e.g., near the edge of the frame), the relative region 237 may appear to the left of the item, while when an item is not on a side of the frame, the relative region 237 may appear to the right of the item (or above, or below, etc.). In any example, the location of the relative region 237 may be determined based on locations of the second object(s) 236 relative to the first object(s) 232 and/or the context of the scene. Once the relative region locations, dimensions, context, and/or other information is determine, this information may be stored in the data store(s) 222 and/or managed by the relative region manager 218 and/or the relative object location manager 220, as described herein.

The method 400, at block B406, includes receiving a second frame of a second video. For example, a frame from a current video may be received by the object detection system 200. In some examples, the analysis of the first frames and the identifying of the location of the relative region may be part of a training process, using training frames or videos, and the second frame of the second video may correspond to a current frame being received by the object detection system 200 once trained (e.g., trained for a particular game, television show, movie, video clip type, etc.).

The method 400, at block B408, includes determining an object location of the object in the second frame. For example, the first object 232 may be located within the second frame using, as non-limiting examples, an object detection algorithm, a computer vision algorithm, machine learning model(s), artificial intelligence, and/or another detection or identification method.

The method 400, at block B410, includes determining a current region location of the region within the second frame. For example, using the location of the first object 232 within the second frame and the location of the relative region 237 relative to the first object 232, the location of the relative region 237 within the second frame may be determined. As described herein, the location of the relative region 237 may include pixel distances, in image space, between anchor point(s) of the first object(s) 232 and one or more points of the relative region 237 (e.g., vertices of the relative region 237, or a centroid of the relative region 237). This location information and/or the dimensions or shape of the relative region 237 may aid the object detection system 200 in determining the pixels within the second frame that correspond to the relative region 237 (e.g., the region that includes the second object 236).

The method 400, at block B412, includes performing one or more operations to determine contextual information from the region within the second frame. For non-limiting examples, an object detection algorithm, a computer vision algorithm, machine learning model(s), artificial intelligence, and/or another detection or identification method may be executed on or within the relative region 237 of the second frame. Where the second object 236 is a textual object (e.g., a game feed, an item description, a player profile, etc.), OCR may be performed to determine the information within the text of the second object 236. This information may be used to determine whether to generate a snapshot, a highlight, or another recording type, whether to generate a notification, whether to update achievements, awards, or other information pertaining to the game, stream, recording, or otherwise, and/or to perform one or more other actions.

Figure 5:
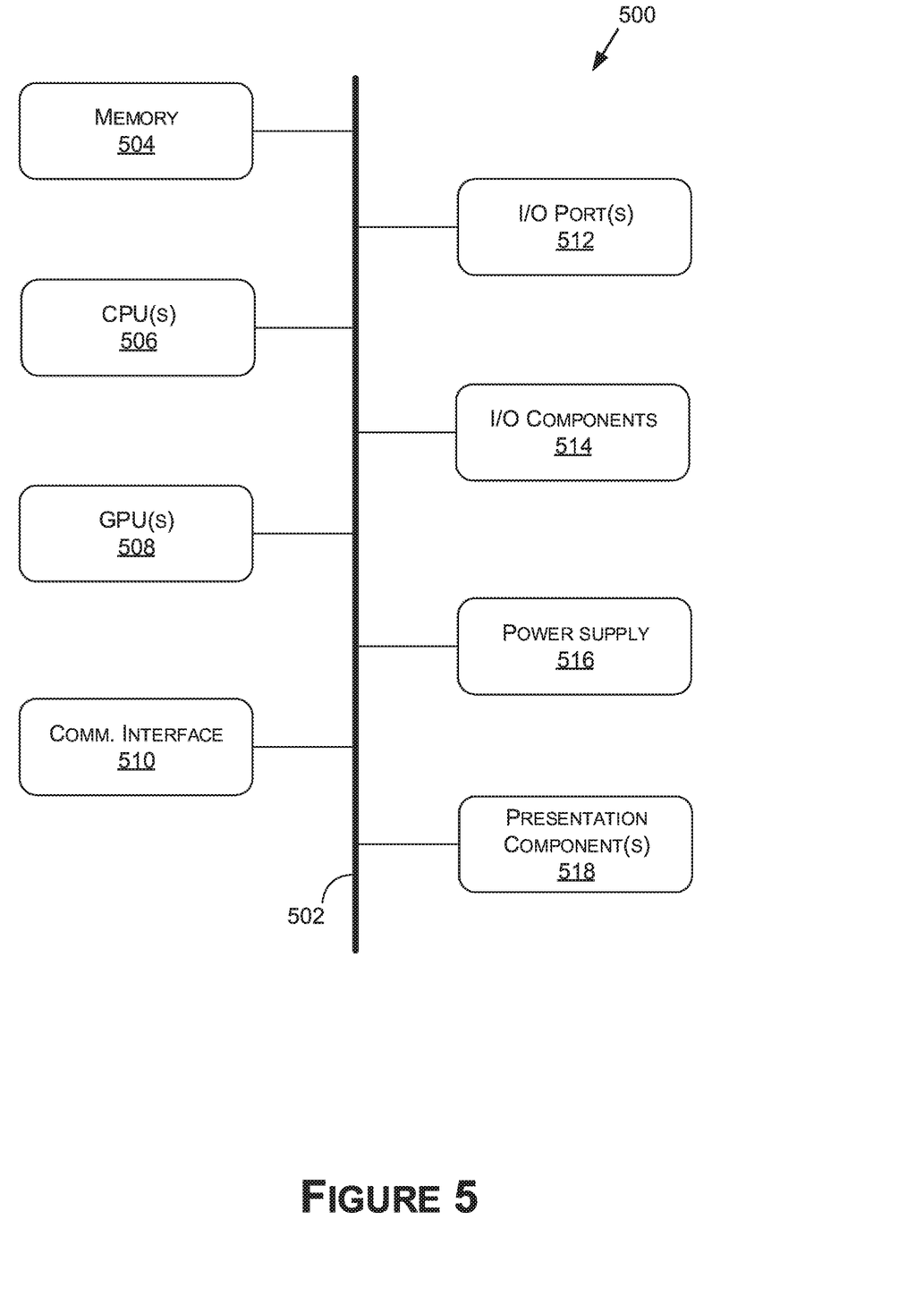
FIG. 5 is a block diagram of an example computing device suitable for use in implementing some embodiments of the present disclosure.

FIG. 5 is a block diagram of an example computing device 500 suitable for use in implementing some embodiments of the present disclosure. Computing device 500 may include a bus 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, and one or more presentation components 518 (e.g., display(s)).

Although the various blocks of FIG. 5 are shown as connected via the bus 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 5.

The bus 502 may represent one or more busses, such as an address bus, a data bus, a control bus, or a combination thereof. The bus 502 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 506 may be configured to execute the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an ARM processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

The GPU(s) 508 may be used by the computing device 500 to render graphics (e.g., 3D graphics). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data. The display memory may be included as part of the memory 504. The GPU(s) 708 may include two or more GPUs operating in parallel (e.g., via a link). When combined together, each GPU 508 may generate pixel data for different portions of an output image or for different output images (e.g., a first GPU for a first image and a second GPU for a second image). Each GPU may include its own memory, or may share memory with other GPUs.

In examples where the computing device 500 does not include the GPU(s) 508, the CPU(s) 506 may be used to render graphics.

The communication interface 510 may include one or more receivers, transmitters, and/or transceivers that enable the computing device 700 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining a spatial relationship between an object and textual information associated with the object;
   determining a first object location of the object in a first frame;
   based at least in part on the spatial relationship and the first object location, determining a first textual information location in the first frame;
   determining a second object location of the object in a second frame, the second object location being different from the first object location;
   based at least in part on the second object location and the spatial relationship, determining a second textual information location in the second frame, the second textual information location being different from the first textual information location; and
   performing one or more operations to determine respective textual information corresponding to the second textual information location.

2. The method of claim 1, wherein the determining the spatial relationship includes applying a plurality of frames to a machine learning model trained to detect a reoccurrence of objects and textual regions relative to the objects.

3. The method of claim 1, wherein at least one of the determining the first object location or the second object location includes executing at least one of an object detection algorithm or a computer vision algorithm.

4. The method of claim 1, wherein the spatial relationship is defined by a pixel distance between the object the textual information, and further wherein the textual information is defined using a textual region having dimensions in pixels.

5. The method of claim 1, wherein at least one of the determining the first object location or the second object location includes determining an anchor point of the object.

6. The method of claim 5, wherein the determining the second textual information location includes determining, in a two dimensional image space, a set of pixel distances between the anchor point of the object and vertices of second textual information location in the second frame.

7. The method of claim 1, wherein the respective textual information associated with the second frame is different from respective textual information associated with the first frame.

8. The method of claim 1, wherein the first frame and the second frame are comprised in a stream or a recording of one or more cloud gaming sessions, and the textual information includes information corresponding to one or more instances of a game from the one or more cloud gaming sessions.

9. A processor comprising processing circuitry to:
   determine a fixed relative location of textual information with respect to a graphical object;
   identify, over a plurality of frames, dynamic object locations of the graphical object;
   identify, within one or more of the plurality of frames, one or more textual information locations based at least in part on the dynamic object locations of the graphical object and the fixed relative location of the textual information; and
   based at least in part on the one or more textual information locations, apply a recognition operation to the textual information of the one or more of the plurality of frames to extract respective textual information.

10. The processor of claim 9, wherein the fixed relative location is defined by a set of delta values, the set of delta values corresponding to pixel distances between an anchor point of the graphical object and vertices of the textual region.

11. The processor of claim 9, wherein the recognition operation includes optical character recognition (OCR).

12. The processor of claim 9, wherein the graphical object is determined to be associated with the textual information based at least in part on an analysis of a plurality of historical frames, the analysis including identifying graphical objects having associated textual information.

13. The processor of claim 9, wherein the plurality of frames are of a stream or a recording of a cloud gaming session, and the textual information includes information corresponding to an instance of a game from the cloud gaming session.

14. The processor of claim 9, further comprising, for at least one frame of the plurality of frames, determining an object region of the at least one frame that includes the graphical object, wherein the identifying the dynamic object locations of the graphical object is within the object region.

15. The processor of claim 9, wherein the processing circuitry is further to:
    analyze the textual information;
    determine, based at least in part on the analyzing, that a recording event has occurred; and
    cause generation of a recording based at least in part on the recording event.

16. A system comprising:
    one or more processing units; and
    one or more memory devices storing instructions that, when executed using the one or more processing units, cause the one or more processing units to execute operations comprising:
       determining a spatial relationship between an object and textual information associated with the object;
       determining a first object location of the object in a first frame;
       based at least in part on the spatial relationship and the first object location, determining a first textual information location in the first frame;
       determining a second object location of the object in a second frame, the second object location being different from the first object location;
       based at least in part on the second object location and the spatial relationship, determining a second textual information location in the second frame, the second textual information location being different from the first textual information location; and
       performing one or more operations to determine respective textual information corresponding to the second textual information location.

17. The system of claim 16, wherein the spatial relationship is defined by one or more relative region location parameters that include a set of delta values corresponding to pixel distances between an anchor point of the object and vertices of a textual region corresponding to the textual information.

18. The system of claim 17, wherein the relative region location parameters are determined based at least in part on an analysis of frames of videos from past streaming sessions.

19. The system of claim 16, wherein the first frame and the second frame are included in a game streaming session, and the operations further include generating a recording of at least a portion of the game streaming session based at least in part on an analysis of the respective textual information.

20. The system of claim 16, wherein the performing the one or more operations includes executing an optical character recognition (OCR) algorithm.

* * * * *